(12) United States Patent
Rodecker

(10) Patent No.: US 8,646,761 B2
(45) Date of Patent: Feb. 11, 2014

(54) EXTERNAL SHEAR-HUB ISOLATOR

(71) Applicant: The Pullman Company, Milan, OH (US)

(72) Inventor: Troy P. Rodecker, Berlin Heights, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 13/682,799

(22) Filed: Nov. 21, 2012

(65) Prior Publication Data

US 2013/0075965 A1    Mar. 28, 2013

Related U.S. Application Data

(63) Continuation of application No. 12/369,024, filed on Feb. 11, 2009, now Pat. No. 8,376,331, which is a continuation-in-part of application No. 12/045,139, filed on Mar. 10, 2008, now Pat. No. 8,152,146, which is a continuation-in-part of application No. 12/043,498, filed on Mar. 6, 2008, now Pat. No. 8,066,266.

(51) Int. Cl.
   *F16F 7/00* (2006.01)

(52) U.S. Cl.
   USPC ............... 267/141.4; 267/141.1; 267/141.5; 267/294; 267/153; 180/68.4; 180/89.2; 180/296; 180/309; 248/60; 248/610

(58) Field of Classification Search
   USPC .......... 267/294, 141.1, 141.4, 141.5, 140.12, 267/153, 293; 248/58, 60, 610, 635; 180/68.4, 89.2, 296, 309
   See application file for complete search history.

(56) References Cited

U.S. PATENT DOCUMENTS

| | | | |
|---|---|---|---|
| 2,227,306 A | 12/1940 | Guy | |
| 3,932,005 A | 1/1976 | Miller | |
| 4,025,269 A | 5/1977 | Reinders | |
| 4,579,184 A | 4/1986 | Hiramoto | |
| 4,651,839 A | 3/1987 | Isobe | |
| 5,158,269 A * | 10/1992 | Hein et al. | 267/220 |
| 5,284,315 A | 2/1994 | Hofmann et al. | |

(Continued)

FOREIGN PATENT DOCUMENTS

| | | |
|---|---|---|
| JP | 2003-202049 | 7/2003 |
| JP | 2005-120847 | 5/2005 |
| WO | 2007037924 | 4/2007 |

OTHER PUBLICATIONS

Search Report and Written Opinion dated Sep. 28, 2009 in corresponding PCT Application No. PCT/US2009/036643.

*Primary Examiner* — Thomas J Williams
*Assistant Examiner* — Mariano Sy
(74) *Attorney, Agent, or Firm* — Harness, Dickey & Pierce, P.L.C.

(57) ABSTRACT

An elastomeric isolator has an elastomeric body which incorporates an inner structural member and an outer structural member. The elastomeric body includes a shear hub extending between radial flanges defined by the inner and outer structural members that undergo shearing stresses during deflection of the elastomeric isolator. The inner and outer structural members are designed to provide a travel stop for the elastomeric isolator in order to avoid compression of the shear hub during high loads. The elastomeric bushing can also include an optional integral elastomeric heat shield which protects the shear hub.

19 Claims, 11 Drawing Sheets

(56) References Cited

U.S. PATENT DOCUMENTS

| | | |
|---|---|---|
| 5,362,035 A | 11/1994 | Carter |
| 5,743,509 A * | 4/1998 | Kanda et al. ............... 248/635 |
| 5,911,936 A * | 6/1999 | Hanazaki et al. ............ 264/250 |
| 6,302,385 B1 * | 10/2001 | Summers et al. .......... 267/140.3 |
| 6,308,810 B1 | 10/2001 | Kuwayama |
| 6,739,557 B2 | 5/2004 | Kato |
| 6,758,300 B2 | 7/2004 | Kromis et al. |
| 7,380,775 B2 | 6/2008 | Niwa et al. |
| 7,510,043 B2 | 3/2009 | Cerri, III |
| 7,637,472 B2 | 12/2009 | Endo |
| 7,644,911 B2 * | 1/2010 | Rodecker .................... 267/293 |
| 7,735,812 B2 * | 6/2010 | Fitzgerald .................. 267/293 |
| 7,785,054 B2 * | 8/2010 | Parisi et al. ................. 411/338 |
| 7,946,925 B2 | 5/2011 | Kawakatsu et al. |
| 8,066,266 B2 | 11/2011 | Rodecker |
| 8,152,146 B2 * | 4/2012 | Rodecker .................... 267/141.4 |
| 8,376,331 B2 * | 2/2013 | Rodecker .................... 267/141.4 |
| 2007/0063401 A1 | 3/2007 | Rodecker |

* cited by examiner

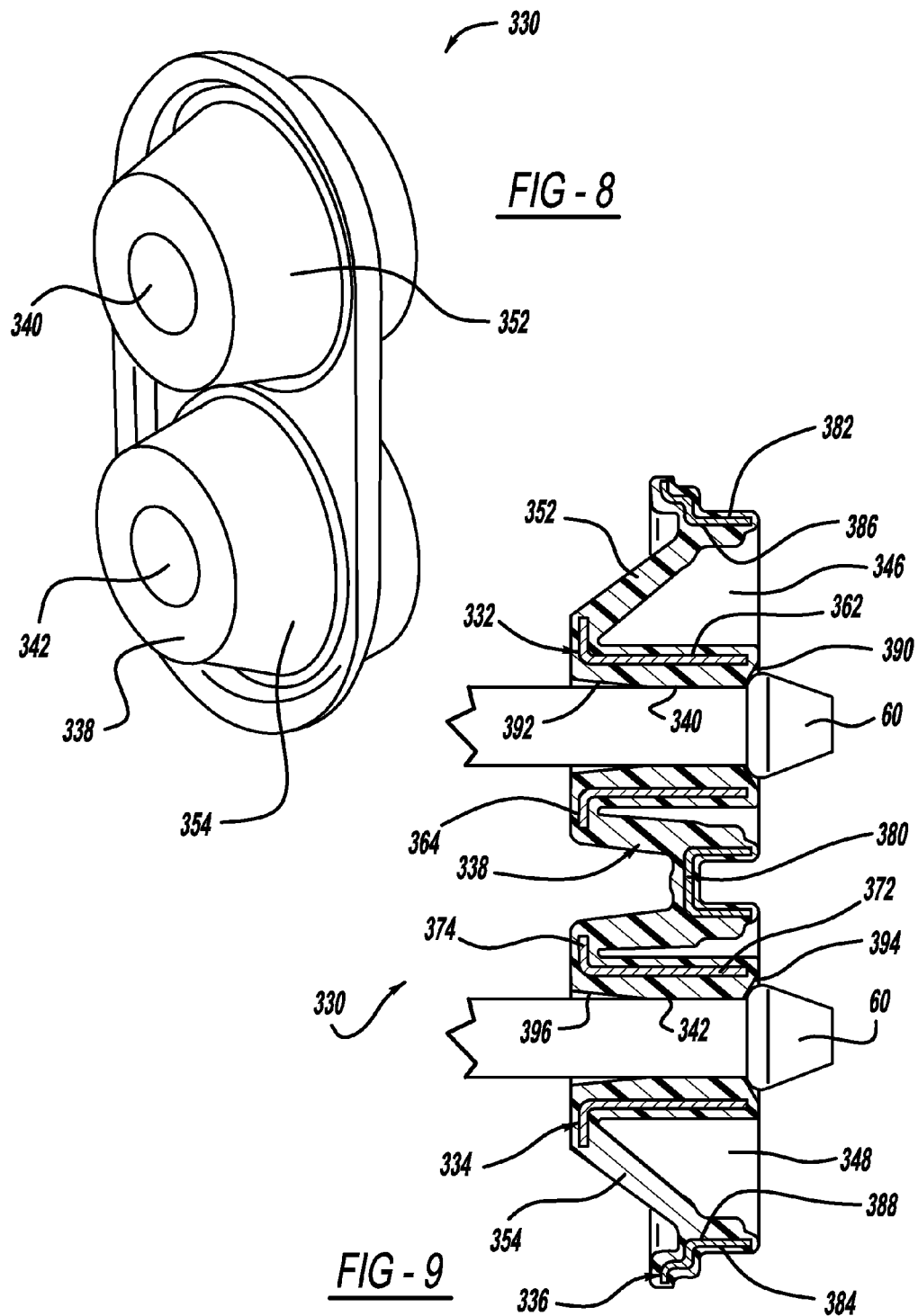

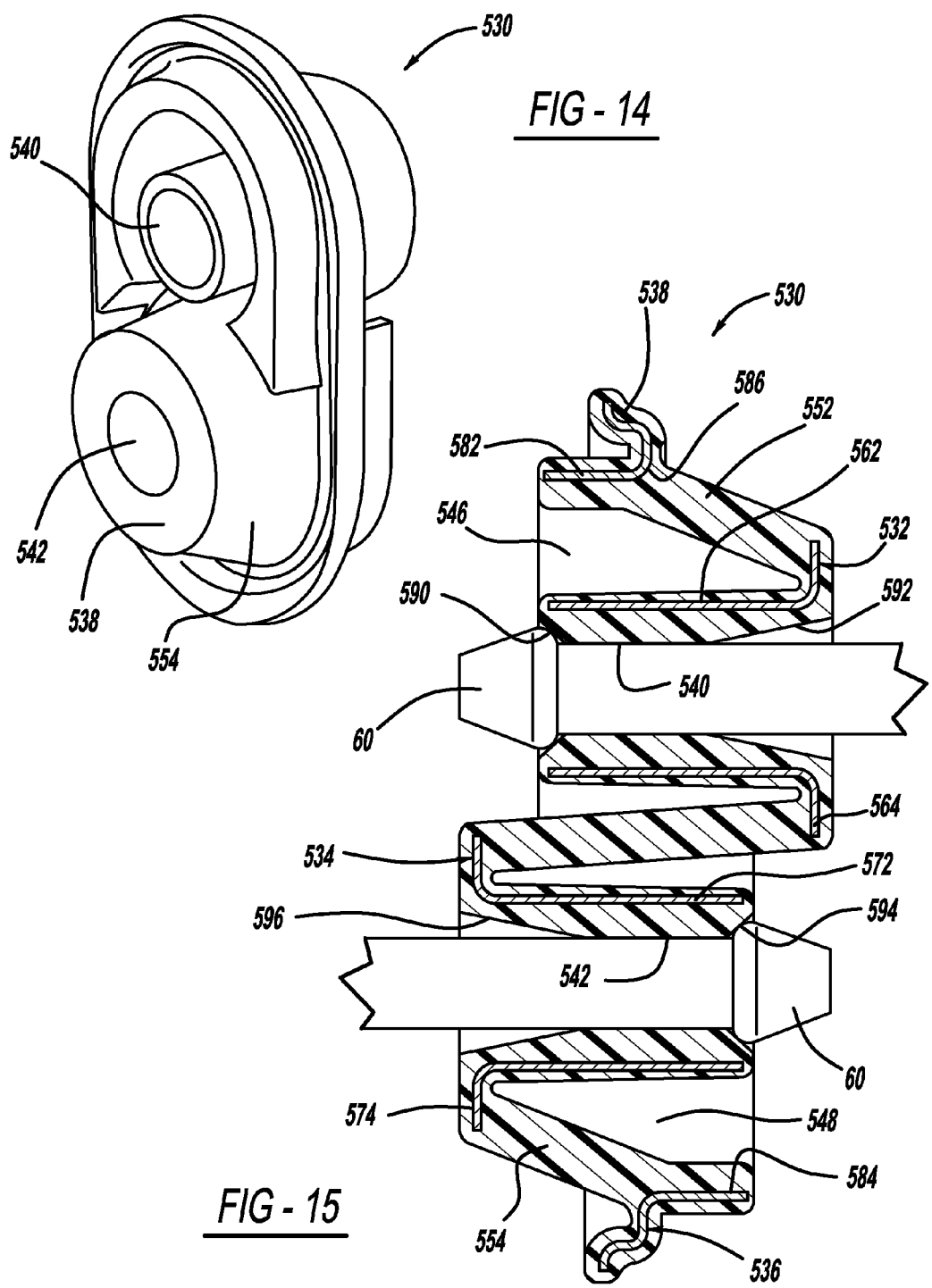

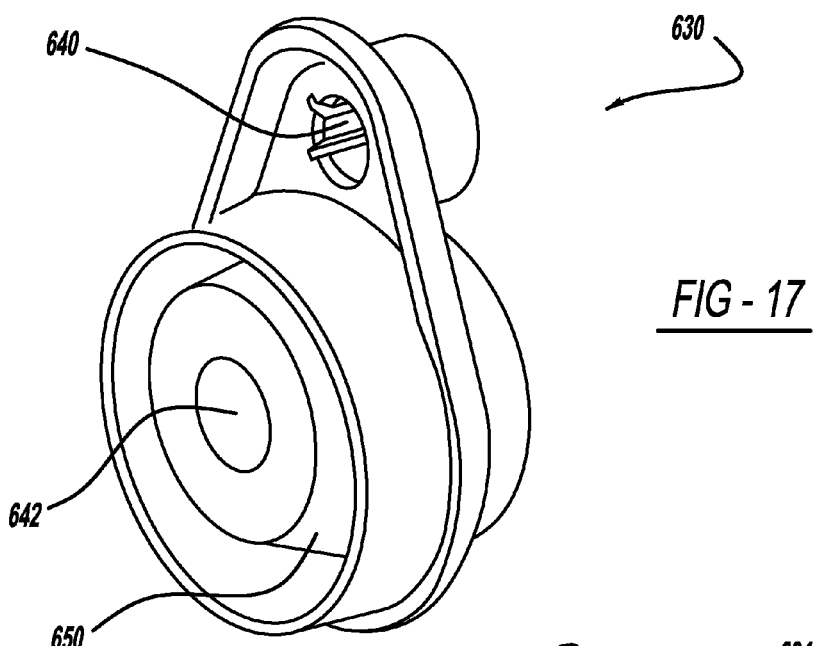
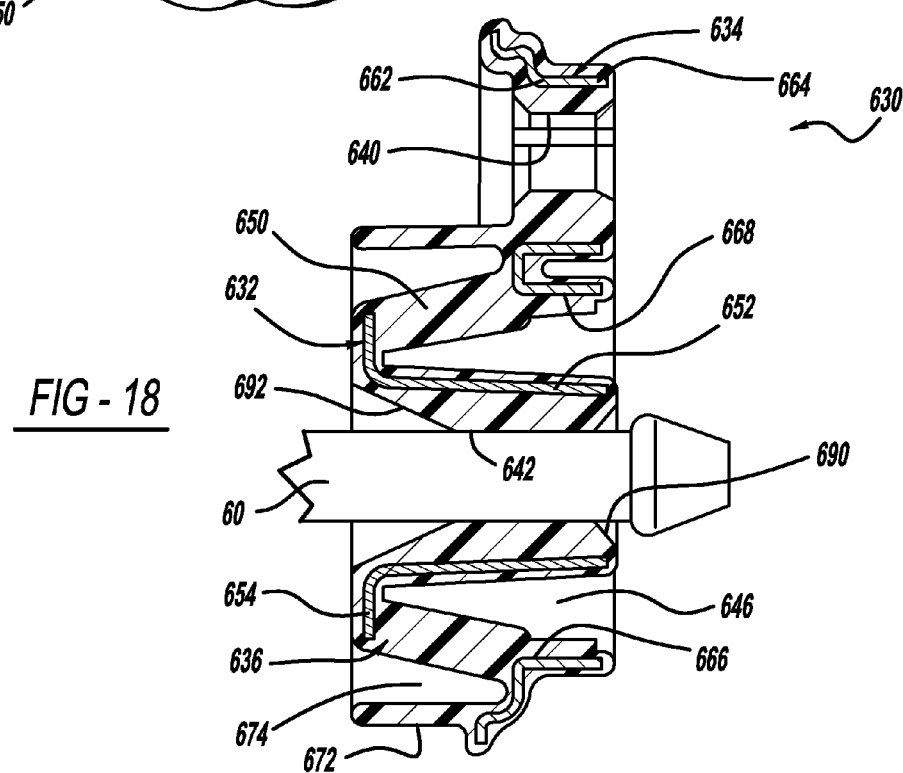
FIG - 17
FIG - 18

EXTERNAL SHEAR-HUB ISOLATOR

CROSS-REFERENCE TO RELATED APPLICATIONS

The present application is a continuation of U.S. Ser. No. 12/369,024 filed Feb. 11, 2009 now U.S. Pat. No. 8,376,331, which is a continuation-in-part of U.S. Ser. No. 12/045,139 filed Mar. 10, 2008 now U.S. Pat. No. 8,152,146 and a continuation-in-part of U.S. Ser. No. 12/043,498 filed Mar. 6, 2008 now U.S. Pat. No. 8,066,266. The disclosures of which are hereby incorporated herein by reference.

FIELD

The present disclosure relates to an isolator such as an automotive exhaust system isolator. More particularly, the present disclosure relates to an isolator which is configured to provide a very soft on-center rate, to have the ability to endure spike durability loads and to avoid compression of the shear-hub element during compression.

BACKGROUND

The statements in this section merely provide background information related to the present disclosure and may not constitute prior art.

Typically, automotive vehicles including cars and trucks have an internal combustion engine which is coupled to at least a transmission and a differential for providing power to the drive wheels of the vehicle. An engine exhaust system which typically includes an exhaust pipe, a catalytic converter and a muffler is attached to the engine to quiet the combustion process, to clean the exhaust gases and to route the products of combustion away from the engine to a desired position typically at the rear of the vehicle. The exhaust system is supported by exhaust mounts which are positioned between the exhaust system and the frame or some other supporting structure of the vehicle body. In order to prevent engine vibrations from being transmitted to the car body, the exhaust mounts incorporate flexible members or elastic suspension members to isolate the vehicle's exhaust system from the vehicle's body. In order to effectively isolate the vehicle's exhaust system from the vehicle's body, it is preferred that the isolator include a soft on-center rate of deflection.

The prior art exhaust mounts or isolators have included rubber isolators which are a solid rubber component or a puck that is at least three-quarters of an inch thick and which is provided with at least one pair of apertures extending therethrough. The apertures each receive an elongated metal stud. The metal stud is provided with an enlarged tapered head that can be forced through the aperture in the isolator, but it cannot be readily removed from the isolator. The opposite end of the stud is welded to or otherwise secured to either a support point in the vehicle or to one of the components of the exhaust system.

Other designs for isolators include elastomeric moldings of a spoke design where spokes are loaded in tension and compression and a shear leg design that include a leg that is subjected to shearing in the primary loading direction. Most elastomers which are utilized for exhaust isolators exhibit poor tensile fatigue properties stemming from low tear strength properties. The preferred method to load the elastomeric material is in compression or shear.

The prior art puck design is the simplest design, and as discussed above, two pins are inserted at opposite ends of the elastomer and the loads inflict pure tension on the elastomer cords connecting both ends. While this is typically the lowest cost design, it is also the most abusive to the material. In order to offset the failure risk, flexible and/or rigid bands are typically designed inside or around the outside of the elastomeric puck. The advantage of this design is its ability to swivel about one hanger hole to accommodate large positional tolerances for the hanger.

The prior art spoke design isolators load the elastomeric material in compression and tension. The tensile loading makes the design vulnerable to fractures in overloaded conditions. The stress magnitude is directly proportional to the load divided by the minimum spoke cross-sectional area. An additional requirement of the spoke design is that the mating component or hanger pin be centered within the deflection zone while statically preloaded by the weight of the exhaust. If it is not, the voids designed into the isolator will be bottomed out or positioned in a groundout condition. This results in the soft on-center rate not being employed, thus defeating the purpose of the isolator.

The prior art shear leg design has a primary loading direction which is typically vertical and a secondary loading direction which is typically lateral. When the shear leg design is loaded in its primary loading direction, the loading method is the preferred shear style loading. In addition, this shear style loading is able to be designed desirably soft. However, the secondary loading direction inflicts tensile compressive stresses which are unfavorable for durability. In addition, the secondary loading direction has a rate that is two to three times stiffer than the primary rate which is also an unfavorable condition.

The continued development of elastomeric mounts has been directed to elastomeric mounts which include a soft on-center rate while avoiding the undesirable tension loading of the elastomeric bushing and which avoid compression of the shear-hub during high ground-out loads.

SUMMARY

The present disclosure provides the art with an elastomeric bushing which uses radial loading to avoid the tension stress loading of the bushing. The radial loading causes shear stresses of the elastomeric bushing regardless of the direction of the loading. Tuning for rate and deflection in specific directions can be independent from other directions by altering voids in the elastomeric bushings. The elastomeric bushing includes a shear-hub which does not compress during high ground-out loads experienced by the isolator. This design also allows the elastomeric bushing to be more compact for reduced package design.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

DRAWINGS

The present disclosure will become more fully understood from the detailed description and the accompanying drawings, wherein:

FIG. 8 is a perspective view of an elastomeric isolator in accordance with another embodiment of the present disclosure;

FIG. 9 is a cross-sectional view of the elastomeric member illustrated in FIG. 8.

FIG. 14 is a perspective view of an elastomeric isolator in accordance with another embodiment of the present disclosure.

FIG. 15 is a cross-sectional view of the elastomeric member illustrated in FIG. 14.

FIG. 17 is a perspective view of an exhaust system isolator in accordance with another embodiment of the present disclosure.

FIG. 18 is a cross-sectional view of the exhaust system isolator illustrated in FIG. 17.

DESCRIPTION

The following description of the preferred embodiment(s) is merely exemplary in nature and is in no way intended to limit the disclosure, its application, or uses.

Figure 5:
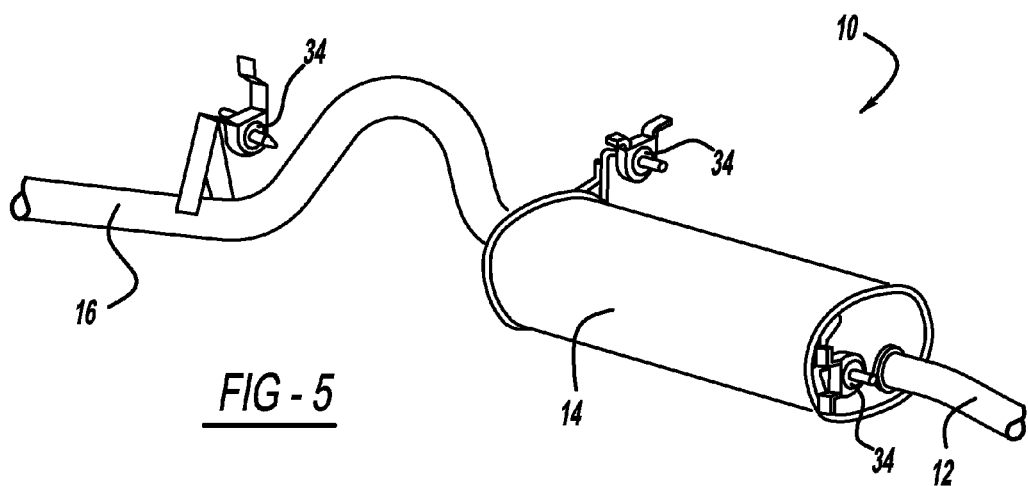
FIG. 5 is a perspective view of an exhaust system which incorporates the unique exhaust isolators in accordance with the present disclosure.

Referring now to the drawings, there is shown in FIG. 5 an exhaust system which includes the exhaust system isolators in accordance with the present disclosure and which is designated generally by the reference numeral 10. A typical vehicle comprises an internal combustion engine (not shown), a body (not shown), a suspension system (not shown) and exhaust system 10 which is attached to the internal combustion engine and which is supported typically beneath the vehicle. The internal combustion engine is designed to power one or more drive wheels of the vehicle and the exhaust system routes the products of combustion to a desired exhaust location around the outside of the vehicle.

Exhaust system 10 comprises an intermediate pipe 12, a muffler 14, a tailpipe 16 and a plurality of isolator assemblies of various designs. Intermediate pipe 12 is typically connected to the engine or to a catalytic converter (not shown) which is then attached to an exhaust pipe which extends between the engine and the catalytic converter. The catalytic converter may be attached to a single exhaust pipe which leads to a single exhaust manifold or the catalytic converter can be attached to a branched exhaust pipe which leads to a plurality of exhaust pipes which lead to a plurality of exhaust manifolds. Also, intermediate pipe 12 can be attached to a plurality of catalytic converters which connect together prior to reaching muffler 14 using intermediate pipe 12 or the vehicle can have a plurality of exhaust pipes, a plurality of catalytic converters, a plurality of intermediate pipes 12 and a plurality of mufflers 14 which connect together using a single or multiple tailpipes 16. In addition, the exhaust system isolator of the present disclosure is applicable to any type of exhaust system including but not limited to dual exhaust systems which have two separate parallel exhaust systems extending from the internal combustion system.

Exhaust system 10 is utilized to route the exhaust gases from the engine to a desired location around the outside of the vehicle. While traveling through the exhaust system, the catalytic converter cleans the exhaust gases and muffler 14 quiets the noise created during the combustion process in the engine. The present disclosure is directed toward the exhaust system isolators which mount exhaust system 10 to the vehicle while at the same time, isolate the movement of exhaust system 10 with respect to the vehicle.

Figures 1, 2:
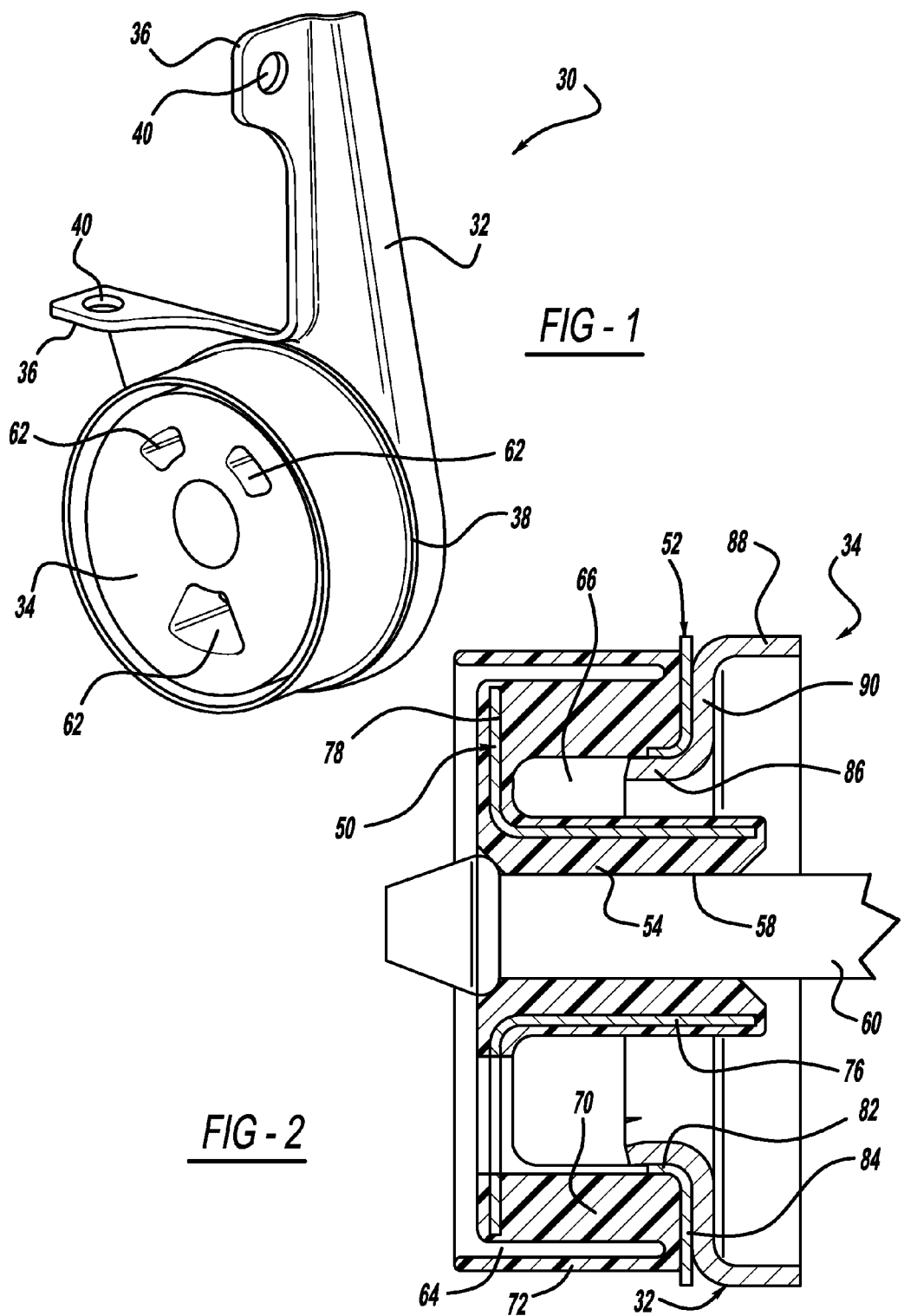
FIG. 1 is a perspective view of an elastomeric isolator assembled to a bracket in accordance with the present disclosure.
FIG. 2 is a cross-sectional view of the elastomeric isolator illustrated in FIG. 1.
Figure 3:
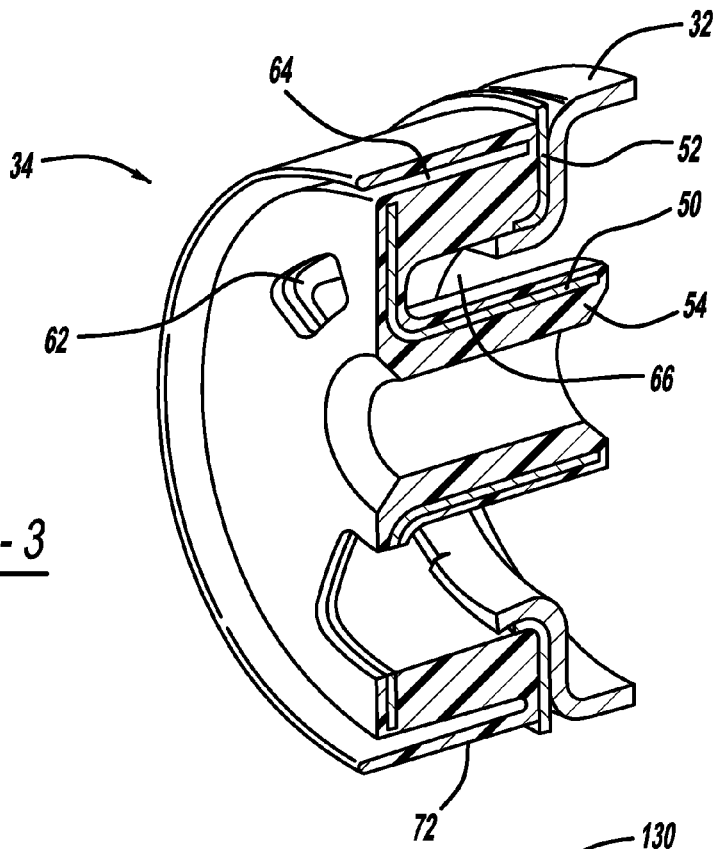
FIG. 3 is a perspective view partially in cross-section illustrating the metal or plastic inserts of the elastomeric isolator illustrated in FIG. 1.

Referring now to FIGS. 1-3, an exhaust system isolator assembly 30 comprises a bracket 32 and an exhaust system isolator 34. Bracket 32 is a metal or plastic component which defines a pair of mounting flanges 36 and an isolator interface 38. Each of the pair of mounting flanges 36 defines a mounting bore 40 which accepts a fastener for securing exhaust system isolator assembly 30 to a vehicle frame or another structural component of the vehicle. While FIG. 1 illustrates mounting flanges 36 being generally perpendicular to each other, it is within the scope of the present disclosure to arrange mounting flanges 36 in any orientation which is required to have bracket 32 properly interface with the mounting structure of the vehicle.

Exhaust system isolator 34 comprises an inner structural member 50, an outer structural member 52 and an elastomeric body 54 disposed between structural members 50 and 52.

Elastomeric body 54 defines a mounting bore 58 which is designed to accept an inner tube, a bolt, or a hanger pin 60. Hanger pin 60 is attached to a component of exhaust system 10. While bracket 32 is disclosed as being attached to a structural component of the vehicle and exhaust system isolator 34 is disclosed as being attached to a component of exhaust system 10, using hanger pin 60, it is within the scope of the present disclosure to have bracket 32 attached to exhaust system 10 and exhaust system isolator 34 attached to a structural component of the vehicle using hanger pin 60. Thus, exhaust system 10 is secured to the vehicle through one or more exhaust system isolator assemblies 30.

Elastomeric body 54 defines one or more press-fitting apertures 62 that extend through elastomeric body 54 and through inner structural member 50. Press-fitting apertures 62 allow for the press-fitting of outer structural member 52 onto bracket 32. Another option would be to integrate outer structural member 52 and bracket 32 such that outer structural member 52 is attached to exhaust system 10 or the structural component of the vehicle. After press-fit, typically a crimping of bracket 32 over outer structural member 52 further secures the attachment. If tuning of exhaust system isolator 34 in different directions is needed, press-fit apertures 62 can be used to provide a non-continuous annular wall for elastomeric body 54. Elastomeric body 54 defines an outer circumferential void 64 and an inner circumferential void 66. While void 66 is illustrated as being asymmetrical with respect to mounting bore 58, it is within the scope of the present disclosure to have void 66 symmetrical with mounting bore 58. The asymmetrical design for void 66 permits mounting bore 58 to become disposed at or near the centerline of outer structural member 52 during the assembled or statically loaded condition of exhaust system isolator assembly 30.

The design of void 66, specifically its radial thickness, will determine the amount of travel of mounting bore 58 with respect to outer structural member 52 and bracket 32 until the load to radially deflect exhaust system isolator assembly 30 spikes up due to the closing of void 66. Until the closing of void 66, the radial movements of mounting bore 58 cause pure shear in elastomeric body 54 regardless of the loading direction. This shear loading occurs in the portion of elastomeric body 54 disposed between outer structural member 52 and inner structural member 50 as discussed below.

As can be seen in the figures, void 64 overlaps inner circumferential void 66 in the axial direction to define a shear hub 70 which undergoes the shear loading due to the deflection of elastomeric body 54. During larger loading of exhaust system isolator assembly 30, void 66 will close until inner structural member 50 makes contact with bracket 32 if bracket 32 is provided separate from outer structural member 52 or with outer structural member 52 if bracket 32 is integrated into outer structural member 52. This contact between inner structural member 50 and bracket 32 or outer structural member 52 eliminates the compression and thus the compression stresses on shear hub 70 when exhaust system isolator assembly 30 experiences high ground-out loads. This improves both the performance and the reliability of exhaust system isolator assembly 30.

An optional annular elastomeric heat shield 72 forms the outer portion of outer circumferential void 64. Elastomeric heat shield 72 is integral with elastomeric body 54. Elastomeric heat shield 72 provides protection against external sources of heat for shear hub 70.

Inner structural member 50 is a flanged cylindrical metal or plastic component which includes an axial cylinder 76 and a radial flange 78. Axial cylinder 76 extends over mounting bore 58 and radial flange 78 extends radially outward from axial cylinder 76 to provide a base for shear hub 70. Elastomeric body 54 is bonded to inner structural member 50 including shear hub 70 being bonded to radial flange 78.

Outer structural member 52 is a flanged cylindrical metal or plastic component which includes an axial cylinder 82 and a radial flange 84. Axial cylinder 82 extends along the outer circumferential surface of inner circumferential void 66 and is designed to be press-fit or otherwise accept bracket 32. While exhaust system isolator assembly 30 is illustrated using a separate bracket 32, it is within the scope of the present disclosure to integrate outer structural member 52 and bracket 32 and bond shear hub 70 directly to bracket 32. Radial flange 84 extends radially outwardly from axial cylinder 76 to provide a base for shear hub 70 at the opposite end of shear hub 70. Elastomeric body 54 is bonded to outer structural member 52 including shear hub 70 being bonded to radial flange 84.

Bracket 32 is a metal or plastic bracket having an inner cylindrical wall 86, an outer wall 88 and a radial wall 90 extending between inner cylindrical wall 86 and outer wall 88. Inner cylindrical wall 86 is designed to be press-fit within an aperture defined by axial cylinder 82 of outer structural member 52 as illustrated in FIG. 2.

Referring now to FIG. 2, it can be seen that axial cylinder 76 of inner structural member 50 extends through the aperture defined by axial cylinder 82 of outer structural member 52 and through inner cylindrical wall 86 of bracket 32. This provides a travel stop for the radial movement of inner structural member 50 in relation to outer structural member 52 which eliminates compression and thus compression stresses on shear hub 70. Inner structural member 50 will move radially with respect to outer structural member 52 to close inner circumferential void 66 until inner structural member 50 contacts bracket 32. An annular portion of elastomeric body 54 located on the outside of inner structural member 50 provides a cushioning affect and avoids direct contact between inner structural member 50 and bracket 32. If bracket 32 is integrated with outer structural member 52 to attach exhaust system isolator assembly 30 to the structural component of the vehicle, either axial cylinder 82 of outer structural member 52, the structural component of the vehicle or a separate bracket can be used for the stop.

Exhaust system isolator 34 avoids tension stress loading in elastomeric body 54 during radial loading. The shear style loading in all directions enables exhaust system isolator 34 to achieve a lower and more stable rate of deflection. This is because the shear modulus (shear loading) is lower than the elasticity modulus (tensile loading). Also, the spring rate of elastomeric materials in shear is more consistent than in tensile. The rates and deflections are capable of being symmetrical about the center axis or they can be tuned using press-fit apertures 62 or by otherwise altering the size or shape of elastomeric body 54 or the rigid structures. An additional advantage is that the rate of deflection for shear hub 70 is linear throughout the deflection (until void 66 closes) which adds robustness to the design in regards to the position. This means that any pre-load from positional tolerances will not spike the rates of deflection and make the Noise, Vibration and Harshness (NVH) of the vehicle change with the exhaust geometry tolerances.

Figure 4:
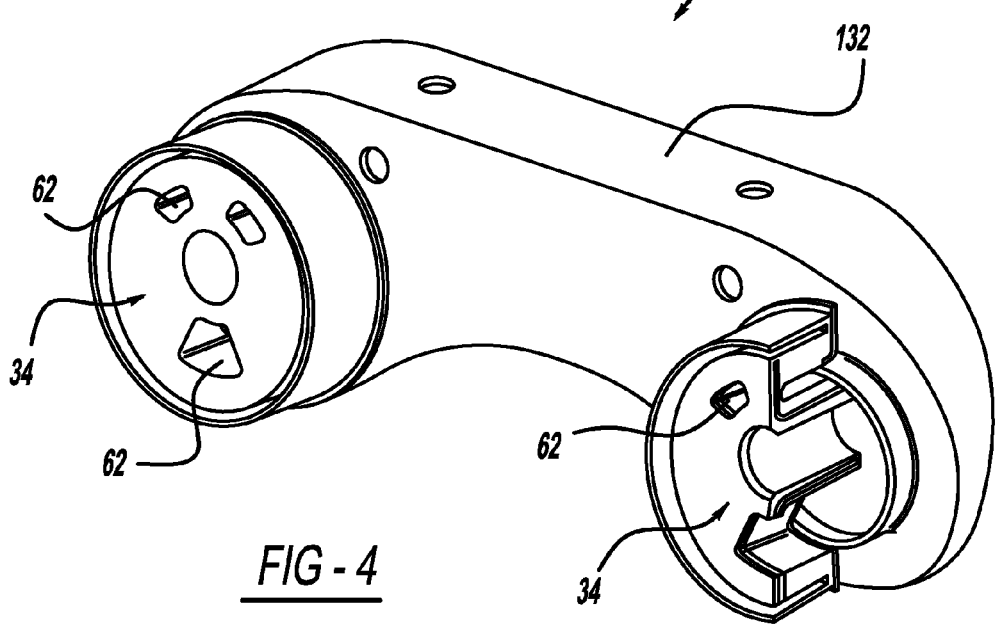
FIG. 4 is a perspective view partially in cross-section of an elastomeric isolator in accordance with another embodiment of the present disclosure.

Referring now to FIG. 4, an exhaust system isolator assembly 130 in accordance with another embodiment of the present disclosure is disclosed. Exhaust system isolator assembly 130 comprises a bracket 132 and a pair of exhaust system isolators 34. The use of bracket 132 instead of bracket 32 permits exhaust system isolator assembly 130 to be attached to the vehicle and the exhaust system using a pair of hanger pins 60. The above discussion regarding bracket 32 applies also to bracket 132. Exhaust system isolator assembly 130 can be a replacement for exhaust system isolator assembly 30.

Figure 6:
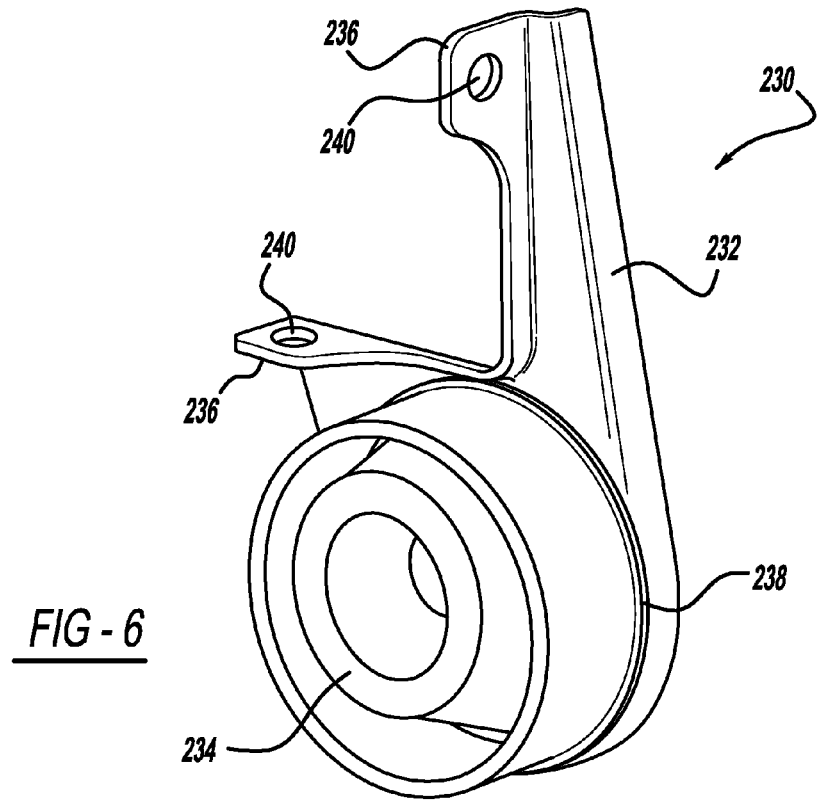
FIG. 6 is a perspective view of an elastomeric isolator and bracket in accordance with another embodiment of the present disclosure.
Figure 7:
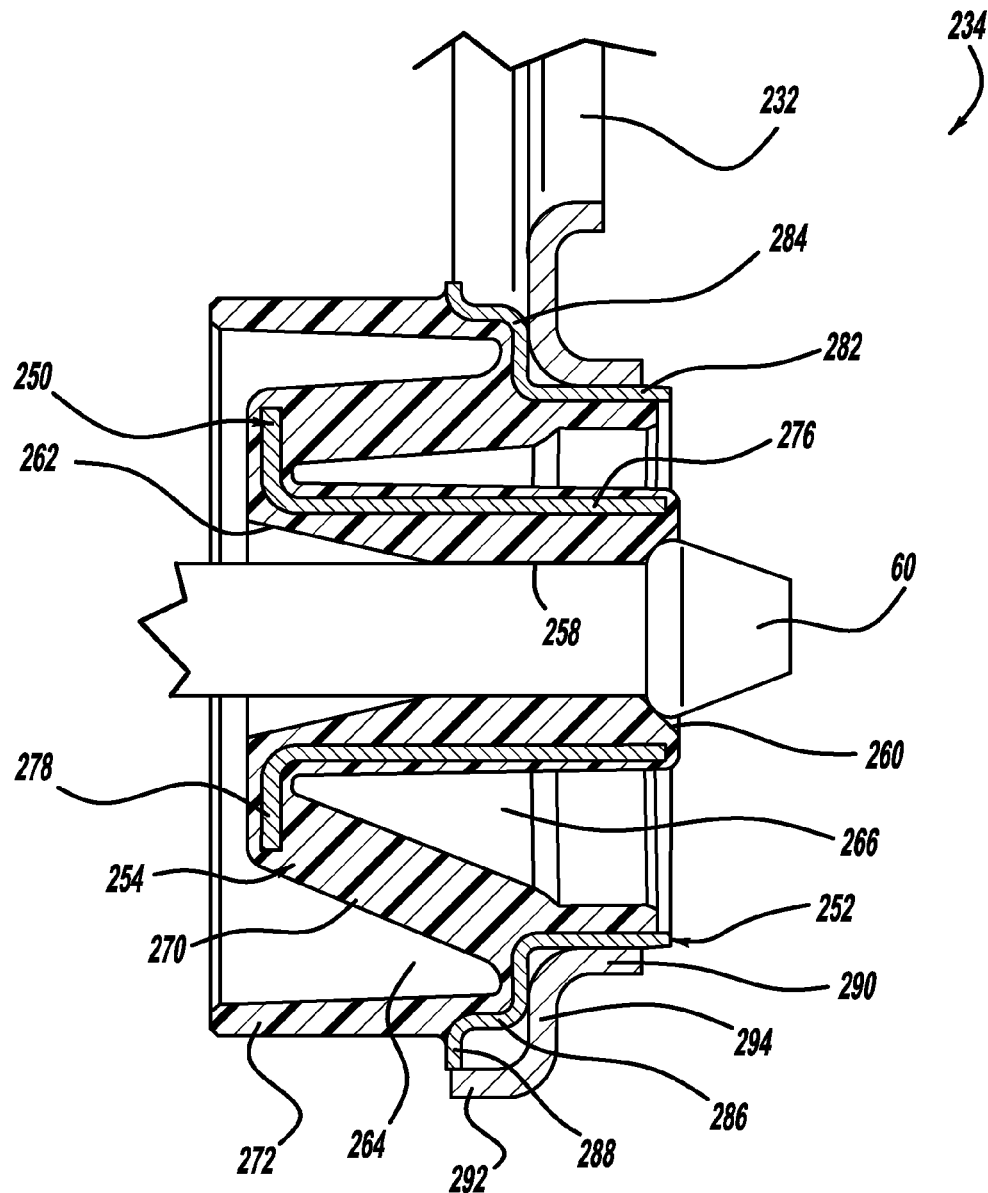
FIG. 7 is a cross-sectional view of the elastomeric isolator illustrated in FIG. 6.

Referring now to FIGS. 6-7, an exhaust system isolator assembly 230 comprises a bracket 232 and an exhaust system isolator 234. Bracket 232 is a metal or plastic component which defines a pair of mounting flanges 236 and an isolator interface 238. Each of the pair of mounting flanges 236 defines a mounting bore 240 which accepts a fastener for securing exhaust system isolator assembly 230 to a vehicle frame or another structural component of the vehicle. While FIG. 6 illustrates mounting flanges 236 being generally perpendicular to each other, it is within the scope of the present disclosure to arrange mounting flanges 236 in any orientation which is required to have bracket 232 properly interface with the mounting structure of the vehicle. Exhaust system isolator assembly 230 can be a replacement for exhaust system isolator assembly 30.

Referring now to FIG. 7, exhaust system isolator 234 comprises an inner structural member 250, an outer structural member 252 and an elastomeric body 254 disposed between structural members 250 and 252.

Elastomeric body 254 defines a mounting bore 258 which is designed to accept an inner tube, a bolt, or a hanger pin 60.

Hanger pin 60 is attached to a component of exhaust system 10. While bracket 232 is disclosed as being attached to a structural component of the vehicle and exhaust system isolator 234 is disclosed as being attached to a component of exhaust system 10, using hanger pin 60, it is within the scope of the present disclosure to have bracket 232 attached to exhaust system 10 and exhaust system isolator 234 attached to a structural component of the vehicle using hanger pin 60. Thus, exhaust system 10 is secured to the vehicle through one or more exhaust system isolator assemblies 230.

Elastomeric body 254 defines a first chamfer 260 located at one end of mounting bore 258 and a second chamfer 262 located at the opposite end of mounting bore 258. First chamfer 260 interfaces with an enlarged head on hanger pin 60. Second chamfer 262 is larger than first chamfer 260 and it allows for the conical rotation or deflection of inner structural member 250 with respect to hanger pin 60 and outer structural member 252. In the preferred embodiment, the large diameter of second chamfer 262 is approximately one and one-half times the diameter of mounting bore 258 and second chamfer 262 has an overall length in the axial direction of mounting bore 258 of approximately twenty millimeters. Elastomeric body 254 defines an outer circumferential void 264 and an inner circumferential void 266. While voids 264 and 266 are illustrated as being asymmetrical with respect to mounting bore 258, it is within the scope of the present disclosure to have voids 264 and 266 symmetrical with mounting bore 258. The asymmetrical design for voids 264 and 266 permits mounting bore 258 to become disposed at or near the centerline of outer structural member 252 during the assembled or statically loaded condition of exhaust system isolator assembly 230.

The design of void 266, specifically its radial thickness, will determine the amount of travel of mounting bore 258 with respect to outer structural member 252 and bracket 232 until the load to radially deflect exhaust system isolator assembly 230 spikes up due to the closing of void 266. Until the closing of void 266, the radial movements of mounting bore 258 cause pure shear in elastomeric body 254 regardless of the loading direction. This shear loading occurs in the portion of elastomeric body 254 disposed between outer structural member 252 and inner structural member 250 as discussed below.

As can be seen in the figures, void 264 overlaps inner circumferential void 266 in the axial direction to define a shear hub 270 which undergoes the shear loading due to the deflection of elastomeric body 254. During larger loading of exhaust system isolator assembly 230, void 266 will close until inner structural member 250 makes contact with outer structural member 252. This contact between inner structural member 250 and outer structural member 252 eliminates the compression and thus the compression stresses on shear hub 270 when exhaust system isolator assembly 230 experiences high ground-out loads. This improves both the performance and the reliability of exhaust system isolator assembly 230.

An annular elastomeric heat shield 272 forms the outer portion of outer circumferential void 264. Elastomeric heat shield 272 is integral with elastomeric body 254. Elastomeric heat shield 272 provides protection against external sources of heat for shear hub 270.

Inner structural member 250 is a flanged cylindrical metal or plastic component which includes an axial cylinder 276 and a radial flange 278. Axial cylinder 276 extends over mounting bore 258 and radial flange 278 extends radially outward from axial cylinder 276 to provide a base for shear hub 270. Elastomeric body 254 is bonded to inner structural member 250 including shear hub 270 being bonded to radial flange 278.

Outer structural member 252 is a multi-flanged cylindrical metal or plastic component which includes a first axial cylinder 282 a first radial flange 284, a second axial cylinder 286 and a second radial flange 288. First axial cylinder 282 extends over inner circumferential void 266 and is designed to be press-fit into or otherwise accept bracket 232. While exhaust system isolator assembly 230 is illustrated using a separate bracket 232, it is within the scope of the present disclosure to integrate outer structural member 252 and bracket 232 and bond shear hub 270 directly to bracket 232. First radial flange 284 extends radially outwardly from first axial cylinder 276 to provide a base for shear hub 270 at the opposite end of shear hub 270. Elastomeric body 254 is bonded to outer structural member 252 including shear hub 270 being bonded to first axial cylinder 282 and first radial flange 284.

Bracket 232 is a metal or plastic bracket having an inner cylindrical wall 290, an outer wall 292 and a radial wall 294 extending between inner cylindrical wall 290 and outer wall 292. Inner cylindrical wall 290 is designed to be press-fit over first axial cylinder 282 of outer structural member 252 as illustrated in FIG. 7.

Referring now to FIG. 7, it can be seen that axial cylinder 276 of inner structural member 250 extends through the aperture defined by first axial cylinder 282 of outer structural member 252 and through inner cylindrical wall 290 of bracket 232. This provides a travel stop for the radial movement of inner structural member 250 in relation to outer structural member 252 which eliminates compression and thus compression stresses on shear hub 270. Inner structural member 250 will move radially with respect to outer structural member 252 to close inner circumferential void 266 until inner structural member 250 contacts outer structural member 252. An annular portion of elastomeric body 254 located on the outside of inner structural member 250 and the inside of outer structural member 252 provides a cushioning affect and avoids direct contact between inner structural member 250 and outer structural member 252. If bracket 232 is integrated with outer structural member 252 to attach exhaust system isolator assembly 230 to the structural component of the vehicle, either first axial cylinder 282 of outer structural member 252, the structural component of the vehicle or a separate bracket can be used for the stop.

Exhaust system isolator 234 avoids tension stress loading in elastomeric body 254 during radial loading. The shear style loading in all directions enables exhaust system isolator 234 to achieve a lower and more stable rate of deflection. This is because the shear modulus (shear loading) is lower than the elasticity modulus (tensile loading). Also, the spring rate of elastomeric materials in shear is more consistent than in tensile. The rates and deflections are capable of being symmetrical about the center axis or they can be tuned using press-fit apertures 62 or by otherwise altering the size or shape of elastomeric body 254 or the rigid structures. An additional advantage is that the rate of deflection for shear hub 270 is linear throughout the deflection (until void 266 closes) which adds robustness to the design in regards to the position. This means that any pre-load from positional tolerances will not spike the rates of deflection and make the Noise, Vibration and Harshness (NVH) of the vehicle change with the exhaust geometry tolerances.

The second chamfer 262 allows for the conical movement or rotation of inner structural member 250 with respect to hanger pin 60 and outer structural member 252. The allowance of this conical motion significantly improves the durability of the component by reducing the cantilever beam stress at the bottom portion of outer circumferential void 264 and inner circumferential void 266.

The mounting system for exhaust system isolator 34 or 234 is not limited to using bracket 32, bracket 132 or bracket 232. Any of the mounting systems disclosed in Applicant's co-pending application Ser. No. 11/233,283, the disclosure of which is incorporated herein by reference, could be utilized to mount exhaust system isolator 34 or 234 to the vehicle.

Figure 10:
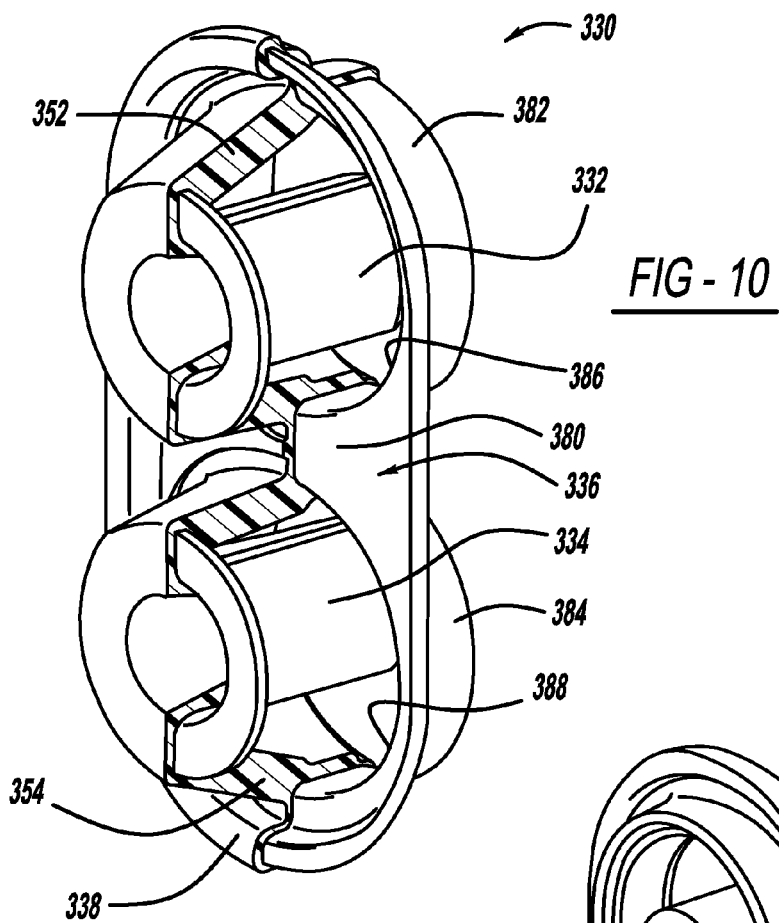
FIG. 10 is a perspective view partially in cross section illustrating the metal or plastic inserts of the elastomeric isolator illustrated in FIG. 8.

Referring now to FIGS. 8-10, an exhaust system isolator 330 is illustrated. Exhaust system isolator 330 can be a replacement for exhaust system isolator assembly 30. Exhaust system isolator 330 comprises a first inner structural member 332, a second inner structural member 334, an outer structural member 336 and an elastomeric body 338.

Elastomeric body 338 defines a first bore 340 and a second bore 342, each of which is designed as a structural member to accept an inner tube, a bolt or hanger pin 60. One hanger pin 60 is attached to a structural component of the vehicle and one hanger pin 60 is attached to a component of exhaust system 10.

Elastomeric body 338 defines a first circumferential void 346 which is disposed around first bore 340 and a second circumferential void 348 which is disposed around second bore 342. The design for circumferential void 346 will determine the amount of travel of first bore 340 with respect to outer structural member 336. The design for second circumferential void 348 will determine the amount of travel of second bore 342 with respect to outer structural member 336. Thus, the design of circumferential voids 346 and 348 will determine the amount of travel of first bore 340 with respect to second bore 342 until the load to radically defect exhaust system isolator 330 spikes up due to the closing of circumferential voids 346 and 348. Until circumferential voids 346 and 348 are closed, radial movements of first bore 340 with respect to second bore 342 cause pure shear in elastomeric body 338 regardless of the load direction. This shear loadings occurs in a first annular or frustoconical shear hub 352 and a second annular or frustoconical shear hub 354 defined by elastomeric body 338. First annual shear hub 352 is disposed between first inner structural member 332 and outer structural member 336. Second annular shear hub 354 is disposed between second inner structural member 334 and outer structural member 336. Tuning for rate and deflection in selected directions can be accomplished independently from other directions by altering the design of elastomeric body 338 using different shaped voids, different wall thickness, different shapes for elastomeric body 338 and by other means known in the art.

As can be seen from the Figures, the portion of elastomeric body 338 which encases first inner structural member 332 is attached to the portion of elastomeric body 338 that covers outer structural member 336 by annular shear hub 352. The portion of elastomeric body 338 which encases second inner structural member 334 is attached to the portion of elastomeric body 338 that covers outer structural member 336 by annular shear hub 354. During movements of first bore 340 with respect to second bore 342, annular shear hubs 352 and 354 are loaded in shear. During larger movements of first bore 340 with respect to second bore 342, first circumferential void 346 and/or second circumferential void 348 will close. At this point of time, the rate of deflection of exhaust system isolator 330 spikes up because the load is now being resisted by outer structural member 336 and one or both of inner structural members 332 and 334 rather than annular shear hub 352 and/or annular shear hub 354. One of the advantages for exhaust system isolator 330 is that when circumferential voids 346 and/or 348 close, there is no direct tension or compression of annular shear hubs 352 and/or 354.

First inner structural member 332 is a metal or plastic component which comprises a generally cylindrical center portion 362 and an annular flange portion 364 attached to one end of generally cylindrical center portion 362. Generally cylindrical center portion 362 extends over first bore 340 and flange portion 364 extends radially outward from the one end of generally cylindrical center portion 362. Flange portion 364 provides a base for one end of annular shear hub 352. Elastomeric body 338 fully encapsulates first inner structural member 332 and is bonded to inner structural member 332 including annular shear hub 352 to annular flange portion 364.

Second inner structural member 334 is a metal or plastic component which comprises a generally cylindrical center portion 372 and an annular flange portion 374 attached to one end of generally cylindrical center portion 372. Generally cylindrical center portion 372 extends over second bore 342 and flange portion 374 extends radially outward from the one end of generally cylindrical center portion 372. Flange portion 374 provides a base for one end of annular shear hub 354. Elastomeric body 338 fully encapsulates second inner structural member 334 and is bonded to inner structural member 334 including annual shear hub 354 to annular flange portion 374. As illustrated in FIGS. 8-10, flange portions 364 and 374 are located on the same side of exhaust system isolator 330.

Outer structural member 336 is a metal or plastic component which comprises a central portion 380, a first axially extending cylindrical portion 382 and a second axial extending cylindrical portion 384. Central portion 380 is a generally planar component having a generally L-shaped flange on its outer periphery. Central portion 380 defines a first bore 386 and a second bore 388. First inner structural member 332 extends through first bore 386 and is surrounded by first axially extending cylindrical portion 382. Second inner structural member 334 extends through second bore 388 and is surrounded by second axially extending cylindrical portion 384. Central portion 380 and first axially extending cylindrical portion 382 provide a base for annular shear hub 352. Central portion 380 and second axially extending cylindrical portion 384 provide a base for annular shear hub 354. Elastomeric body 338 fully encapsulates outer structural member 336 and is bonded to outer structural member 336 including annular shear hubs 352 and 354 being bonded to outer structural member 336.

Annular shear hubs 352 and 354 surround first and second bores 340 and 342, respectively, such that any radial loading from the application causes shear stress in annular shear hubs 352 and 354. In addition, annular shear hubs 352 and 354 are not disposed between portions of inner structural members 332 and 334 and outer structural member 336 which will contact each other during peak loading. Thus, during peak loadings, annular shear hubs 352 and 354 are not compressed between inner structural members 332 and 334 and outer structural member 336.

Elastomeric body 338 defines a first chamfer 390 located at one end of first bore 340, and a second chamfer 392 at the opposite end of first bore 340. First chamfer 390 interfaces with an enlarged head on hanger pin 60. Second chamfer 392 is larger than first chamfer 390 and it allows for conical rotation or deflection for first inner structural member 332 with respect to hanger pin 60 and outer structural member 336. In the preferred embodiment, the large diameter of second chamfer 392 is approximately one and one-half times the diameter of first bore 340 and second chamfer 392 has an overall length in the axial direction of first bore 340 of approximately twenty millimeters.

Elastomeric body 338 defines a first chamfer 394 located at one of second bore 342 and a second chamfer 396 at the opposite end of second bore 342. First chamfer 394 interfaces with an enlarged head on hanger pin 60. Second chamfer 396 is larger than first chamfer 394 and it allows for conical rotation or deflection of second inner structural member 334 with respect to hanger pin 60 and outer structural member 336. In the preferred embodiment, the large diameter of second chamfer 396 is approximately one and one-half times the diameter of second bore 342 and second chamfer 396 has an overall length in the axial direction of second bore 342 of approximately twenty millimeters.

Figure 11:
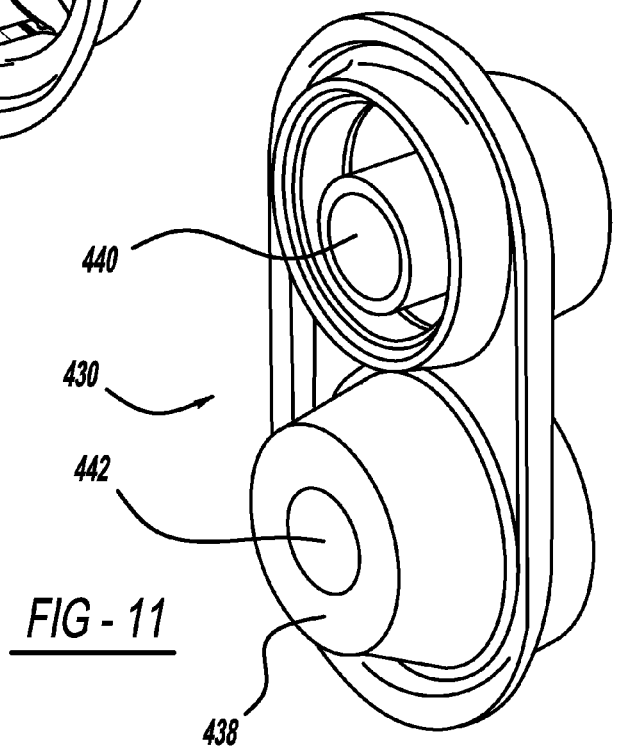
FIG. 11 is a perspective view of an elastomeric isolator in accordance with another embodiment of the present disclosure.
Figures 12, 13:
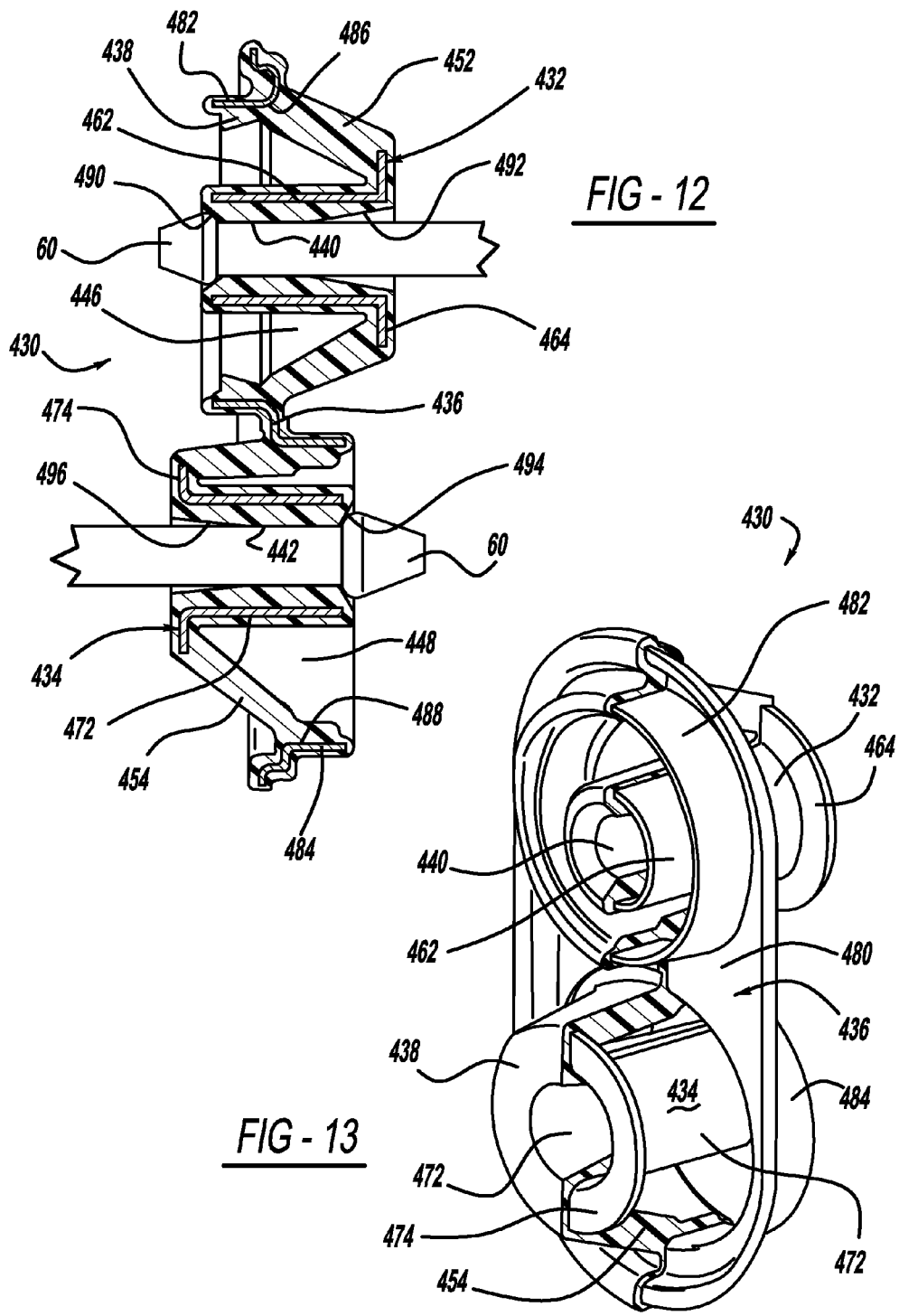
FIG. 12 is a cross-sectional view of the elastomeric member illustrated in FIG. 11.
FIG. 13 is a perspective view partially in cross section illustrating the metal or plastic inserts of the elastomeric isolator illustrated in FIG. 11.

Referring now to FIGS. 11-13, an exhaust system isolator 430 is illustrated. Exhaust system isolator 430 can be a replacement for exhaust system isolator assembly 30. Exhaust system isolator 430 comprises a first inner structural member 432, a second inner structural member 434, an outer structural member 436 and an elastomeric body 438.

Elastomeric body 438 defines a first bore 440 and a second bore 442, each of which is designed as a structural member to accept an inner tube, a bolt or hanger pin 60. One hanger pin 60 is attached to a structural component of the vehicle and one hanger pin 60 is attached to a component of exhaust system 10.

Elastomeric body 438 defines a first circumferential void 446 which is disposed around first bore 440 and a second circumferential void 448 which is disposed around second bore 442. The design for circumferential void 446 will determine the amount of travel of first bore 440 with respect to outer structural member 436. The design for circumferential void 448 will determine the amount of travel of second bore 442 with respect to outer structural member 436. Thus, the design of circumferential voids 446 and 448 will determine the amount of travel of first bore 440 with respect to second bore 442 until the load to radically defect exhaust system isolator 430 spikes up due to the closing of circumferential voids 446 and 448. Until circumferential voids 446 and 448 are closed, radial movements of first bore 440 with respect to second bore 442 cause pure shear in elastomeric body 438 regardless of the load direction. This shear loadings occurs in a first annular or frustoconical shear hub 452 and a second annular or frustoconical shear hub 454 defined by elastomeric body 438. First annual shear hub 452 is disposed between first inner structural member 432 and outer structural member 436. Second annular shear hub 454 is disposed between second inner structural member 434 and outer structural member 436. Tuning for rate and deflection in selected directions can be accomplished independently from other directions by altering the design of elastomeric body 438 using different shaped voids, different wall thickness, different shapes for elastomeric body 438 and by other means known in the art.

As can be seen from the Figures, the portion of elastomeric body 438 which encases first inner structural member 432 is attached to the portion of elastomeric body 438 that covers outer structural member 436 by annular shear hub 452. The portion of elastomeric body 438 which encases second inner structural member 434 is attached to the portion of elastomeric body 438 that covers outer structural member 436 by annular shear hub 454. During movements of first bore 440 with respect to second bore 442, annular shear hubs 452 and 454 are loaded in shear. During larger movements of first bore 440 with respect to second bore 442, first circumferential void 446 and/or second circumferential void 448 will close. At this point of time, the rate of deflection of exhaust system isolator 430 spikes up because the load is now being resisted by outer structural member 436 and one or both of inner structural members 432 and 434 rather than annular shear hub 452 and/or annular shear hub 454. One of the advantages for exhaust system isolator 430 is that when circumferential voids 446 and/or 448 close, there is no direct tension or compression of annular shear hubs 452 and/or 454.

First inner structural member 432 is a metal or plastic component which comprises a generally cylindrical center portion 462 and an annular flange portion 464 attached to one end of generally cylindrical center portion 462. Generally cylindrical center portion 462 extends over first bore 440 and flange portion 464 extends radially outward from the one end of generally cylindrical center portion 462. Flange portion 464 provides a base for one end of annular shear hub 452. Elastomeric body 438 fully encapsulates first inner structural member 432 and is bonded to inner structural member 432 including annular shear hub 452 to annular flange portion 464.

Second inner structural member 434 is a metal or plastic component which comprises a generally cylindrical center portion 472 and an annular flange portion 474 attached to one end of generally cylindrical center portion 472. Generally cylindrical center portion 472 extends over second bore 442 and flange portion 474 extends radially outward from the one end of generally cylindrical center portion 472. Flange portion 474 provides a base for one end of annular shear hub 454. Elastomeric body 438 fully encapsulates second inner structural member 434 and is bonded to inner structural member 434 including annual shear hub 454 to annular flange portion 474. As illustrated in FIGS. 11-13, flange portions 464 and 474 are located on opposite sides of exhaust system isolator 430.

Outer structural member 436 is a metal or plastic component which comprises a central portion 480, a first axially extending cylindrical portion 482 and a second axial extending cylindrical portion 484. Central portion 480 is a generally planar component having a generally L-shaped flange on its outer periphery. Central portion 480 defines a first bore 486 and a second bore 488. First inner structural member 432 extends through first bore 486 and is surrounded by first axially extending cylindrical portion 482. Second inner structural member 434 extends through second bore 488 and is surrounded by second axially extending cylindrical portion 484. Central portion 480 and first axially extending cylindrical portion 482 provide a base for annular shear hub 452. Central portion 480 and second axially extending cylindrical portion 484 provide a base for annular shear hub 454. Elastomeric body 438 fully encapsulates outer structural member 436 and is bonded to outer structural member 436 including annular shear hubs 452 and 454 being bonded to outer structural member 436.

Annular shear hubs 452 and 454 surround first and second bores 440 and 442, respectively, such that any radial loading from the application causes shear stress in annular shear hubs 452 and 454. In addition, annular shear hubs 452 and 454 are not disposed between portions of inner structural members 432 and 434 and outer structural member 436 which will contact each other during peak loadings. Thus, during peak loadings, annular shear hubs 452 and 454 are not compressed between inner structure members 432 and 434 and outer structural member 436.

Elastomeric body 438 defines a first chamfer 490 located at one end of first bore 440, and a second chamfer 492 at the opposite end of first bore 440. First chamfer 490 interfaces with an enlarged head on hanger pin 60. Second chamfer 492 is larger than first chamfer 490 and it allows for conical rotation or deflection for first inner structural member 432 with respect to hanger pin 60 and outer structural member 436. In the preferred embodiment, the large diameter of second chamfer 492 is approximately one and one-half times the diameter of first bore 440 and second chamfer 492 has an overall length in the axial direction of first bore 440 of approximately twenty millimeters.

Elastomeric body 438 defines a first chamfer 494 located at one of second bore 442 and a second chamfer 496 at the opposite end of second bore 442. First chamfer 494 interfaces with an enlarged head on hanger pin 60. Second chamfer 496 is larger than first chamfer 494 and it allows for conical rotation or deflection of second inner structural member 434 with respect to hanger pin 60 and outer structural member 436. In the preferred embodiment, the large diameter of second chamfer 496 is approximately one and one-half times the diameter of second bore 442 and second chamfer 496 has an overall length in the axial direction of second bore 442 of approximately twenty millimeters.

Figure 16:
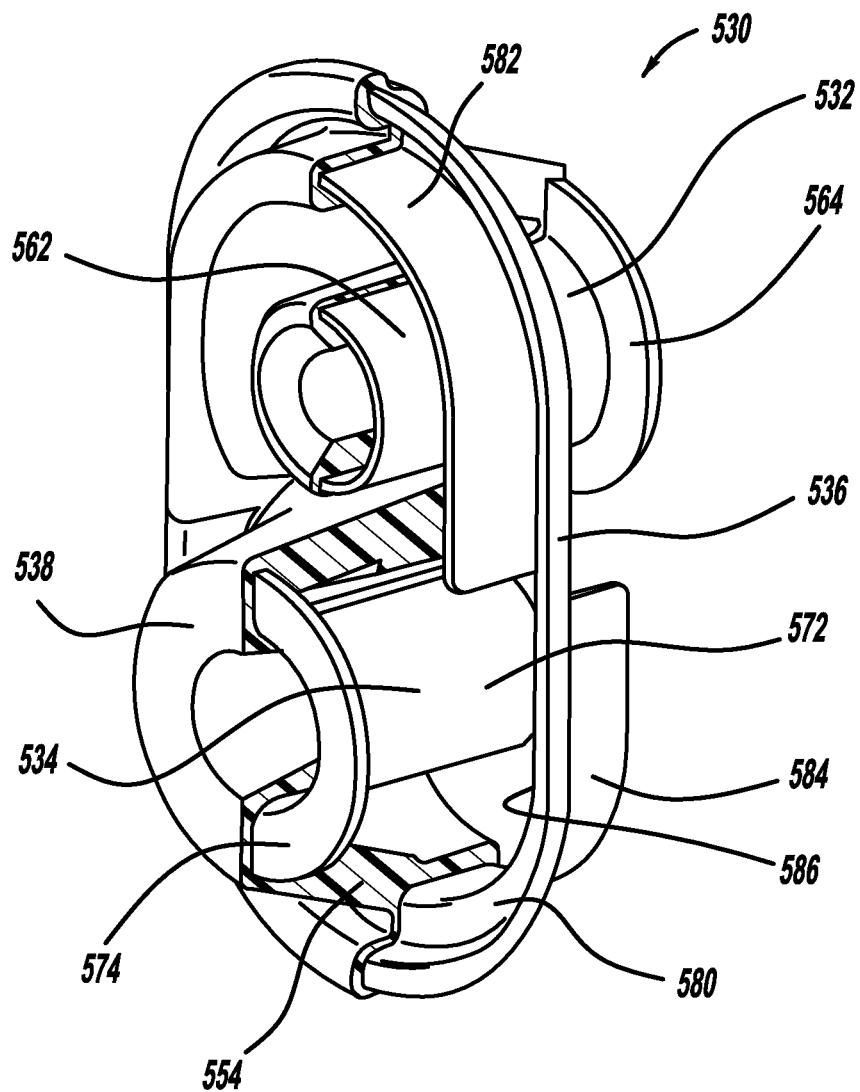
FIG. 16 is a perspective view partially in cross section illustrating the metal or plastic inserts of the elastomeric isolator illustrated in FIG. 14.

Referring now to FIGS. 14-16, an exhaust system isolator 530 is illustrated. Exhaust system isolator 530 can be a replacement for exhaust system isolator assembly 30. Exhaust system isolator 530 comprises a first inner structural member 532, a second inner structural member 534, an outer structural member 536 and an elastomeric body 538.

Elastomeric body 538 defines a first bore 540 and a second bore 542 each of which is designed as a structural member to accept an inner tube, a bolt or hanger pin 60. One hanger pin 60 is attached to a structural component of this vehicle and one hanger pin 60 is attached to a component of exhaust system 10.

Elastomeric body 538 defines a first circumferential void 546 which is disposed around first bore 540 and a second circumferential void 548 which is disposed around second bore 542. The design for circumferential void 546 will determine the amount of travel of first bore 540 with respect to outer structural member 536. The design for circumferential void 548 will determine the amount of travel of second bore 542 with respect to outer structural member 536. Thus, the design of circumferential voids 546 and 548 will determine the amount of travel of first bore 540 with respect to second bore 542 until the load to radially deflect exhaust system isolator 530 spikes due to the closing of circumferential voids 546 and 548. Until circumferential voids 546 and 548 are closed, radial movements of first bore 540 with respect to second bore 542 cause pure shear in elastomeric body 538 regardless of the load direction. The shear loading occurs in a first annular or frustoconical shear hub 552 and a second annular or frustoconical shear hub 554 defined by elastomeric body 538. First annular shear hub 552 is disposed between first inner structural member 532 and outer structural member 536. Second annular shear hub 554 is disposed between second inner structural member 534 and outer structural member 536. As illustrated in the Figures, between first bore 540 and second bore 542, annular shear hub 552 and annular shear hub 554 combine to form a single common or integral shear hub. Tuning for rate and deflection in selected directions can be accomplished independently from other directions by altering the design of elastomeric body 538 using different shaped voids, different wall thicknesses, different shapes for elastomeric body 538 and by other means known in this art.

As can be seen from the Figures, the portion of elastomeric body 538 which encases first inner structural member 532 is attached to the portion of elastomeric body 538 that covers outer structural member 536 by annular shear hub 552. The portion of elastomeric body 538 which encases second inner structural member 534 is attached to the portion of elastomeric body 538 that covers outer structural member 536 by annular shear hub 554. During movements of first bore 540 with respect to second bore 542, annular shear hubs 552 and 554 are loaded in shear. During larger movements of first bore 540 with respect to second bore 542 first circumferential void 546 and/or second circumferential void 548 will close. At this point of time, the rate of deflection of exhaust system isolator 530 spikes up because the load is now being resisted by outer structural member 536 and one or both of inner structural member 532 and 534 rather than annular shear hub 552 and/or annular shear hub 554. One of the advantages for exhaust system isolator 530 is that when circumferential voids 546 and/or 548 close, there is no direct tension or compression of annular shear hubs 552 and/or 554.

First inner structural member 532 is a metal or plastic component which comprises a generally cylindrical center portion 562 and an annular flange portion 564 attached to one end of generally cylindrical center portion 562. Generally cylindrical center portion 562 extends over first bore 540 and flange portion 564 extends radially outward from the one end of generally cylindrical center portion 562. Flange portion 564 provides a base for one end of annular shear hub 552. Elastomeric body 538 fully encapsulates first inner structural member 532 and is bonded to first inner structural member 532 including annular shear hub 552 to flange portion 564.

Second inner structural member 534 is a metal or plastic component which comprises a generally cylindrical center portion 572 and an annular flange portion 574 attached to one end of generally cylindrical center portion 572. Generally cylindrical center portion 572 extends over second bore 542 and flange portion 574 extends radially outward from the one end of generally cylindrical center portion 572. Flange portion 574 provides a base for one end of annular shear hub 554. Elastomeric body 538 fully encapsulates second inner structural member 534 and is bonded to second inner structural member 534 including annular shear hub 554 to flange portion 574. As illustrated in FIGS. 14-16, flange portions 564 and 574 are located on opposite sides of exhaust system isolator 530.

Outer structural member 536 is a metal or plastic component which comprises a central portion 580, a first axially extending portion 582 and a second axially extending portion 584. Central portion 580 is a generally oval shaped component having a generally L-shaped flange on its outer periphery. Central portion 580 defines a central bore 586. First inner structural member 532 extends through central bore 586 and is partially surrounded by first axially extending portion 582. Second inner structural member 534 also extends through central bore 586 and is partially surrounded by second axially extending portion 584. Central portion 580 and first axial extending portion 582 provide a base for annular shear hub 552. Central portion 580 and second axially extending portion 584 provide a base for annular shear hub 554. Elastomeric body 538 fully encapsulates outer structural member 536 and is bonded to outer structural member 536 including annular shear hubs 552 and 554 being bonded to outer structural member 536.

Annular shear hubs 552 and 554 surround first and second bores 540 and 542, respectively, such that any radial loading from the application causes shear stress in annular shear hubs 552 and 554. In addition, annular shear hubs 552 and 554 are not disposed between portions of inner structural members 532 and 534 and outer structural member 336 which will contact each other during peak loading. The portion of annular shear hubs 552 and 554 located between first bore 540 and second bore 542 which form the single, common or integral shear hub, could undergo compression if the loading caused first bore 540 to move directly towards second bore 542 but this is a limited movement of exhaust system isolator 530.

Elastomeric body 538 defines a first chamfer 590 located at one end of first bore 540 and a second chamfer 592 at the opposite end of first bore 540. First chamfer 590 interfaces with an enlarged head on hanger pin 60. Second chamfer 592 is larger than first chamfer 590 and it allows for conical rotation or deflection of first inner structural member 532 with respect to hanger pin 60 and outer structural member 536. In the preferred embodiment, the large diameter of second chamfer 592 is approximately one and one-half times the diameter of first bore 540 and second chamfer 592 has an overall length in the axial direction of first bore 540 of approximately twenty millimeters.

Elastomeric body 538 defines a first chamfer 594 located at one end of second bore 542 and a second chamfer 596 at the opposite end of second bore 542. First chamfer 594 interfaces with an enlarged head on hanger pin 60. Second chamfer 596 is larger than first chamfer 594 and it allows for conical rotation on deflection of second inner structural member 534 with respect to hanger pin 60 and outer structural member 536. In the preferred embodiment, the large diameter of second chamfer 596 is approximately one and one-half times the diameter of second bore 542 and second chamfer 596 has an overall length in the axial direction of second bore 542 of approximately twenty millimeters.

Figure 19:
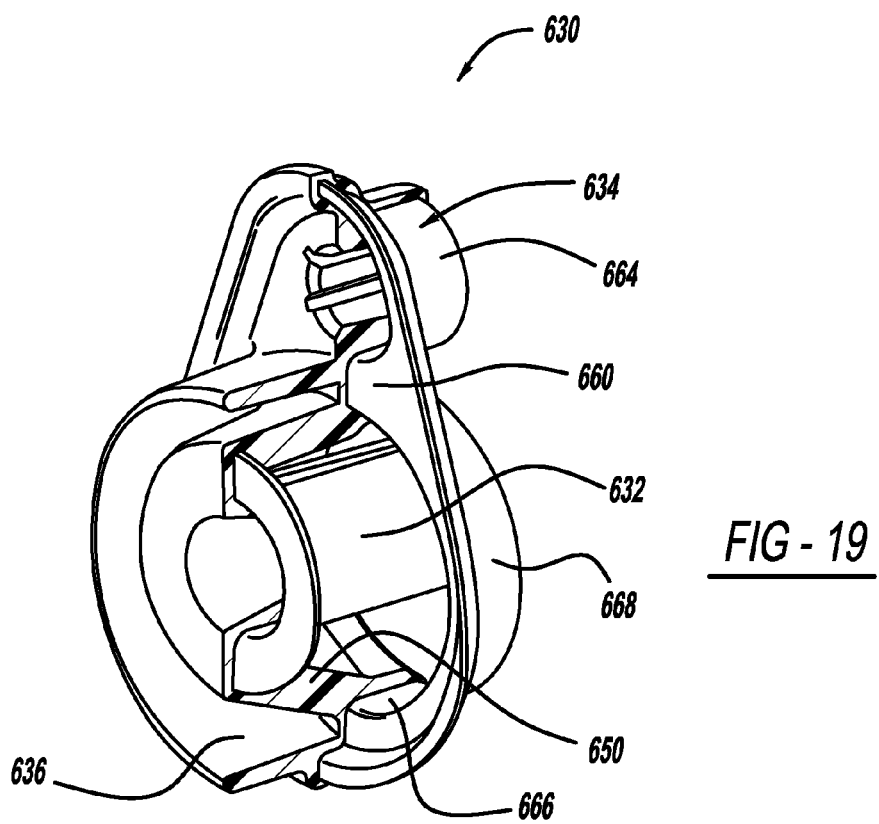
FIG. 19 is a perspective view partially in cross-section of the exhaust system isolator illustrated in FIGS. 17 and 18.

Referring now to FIGS. 17-19, an exhaust system isolator 630 in accordance with another embodiment of the present disclosure is illustrated. Exhaust system isolator 630 comprises an inner structural member 632, an outer structural member 634 and an elastomeric body 636.

Elastomeric body 636 defines a first mounting bore 640 and a second mounting bore 642, each of which is designed as a structural member to accept an inner tube, a bolt or a hanger pin 60. One hanger pin 60 is attached to a structural component of the vehicle and one hanger pin 60 is attached to a component of exhaust system 10.

Elastomeric body 636 defines a circumferential void 646 which is located below first mounting bore 640. The portion of elastomeric body 636 that forms second mounting bore 642 defines circumferential void 646. The design of circumferential void 646 and the design of the portion of elastomeric body 636 that forms second mounting bore 642 will determine the amount of travel of second mounting bore 642 with respect to first mounting bore 640 until the load to radially deflect exhaust system isolator 630 spikes up due to the closing of circumferential void 646 or the gap between the portion of elastomeric body 636 that defines second mounting bore 642 and the portion of elastomeric body 636 that encases outer structural member 634. Until circumferential void 646 or this gap is closed, radial movements of second mounting bore 642 with respect to first mounting bore 640 cause pure shear in elastomeric body 636 regardless of the loading direction. The shear loading occurs in an annular frustoconical shear hub 650 defined by elastomeric body 636 which is disposed between outer structural member 634 and inner structural member 632 as discussed below. Tuning for rate and deflection in selected directions can be accomplished independently from other directions by altering the design of elastomeric body 636, using different shaped voids, additional voids, different shapes for elastomeric body 636 and by other means known in the art.

As can be seen from the figures, the portion of elastomeric body 636 which forms second mounting bore 642 is attached to the portion of elastomeric body 636 which fully encapsulates outer structural member 634 and forms first mounting bore 640 to form circumferential void 646 by annular shear hub 650. During movements of exhaust system isolator 630, annular shear hub 650 is loaded in shear. During larger movements of exhaust system isolator 630, the gap between the portion of elastomeric body 636 forming second mounting bore 642 and the portion of elastomeric body 636 encapsulating outer structural member 634 and forming circumferential void 646 closes. At this point in time, the rate of deflection of exhaust system isolator 630 spikes up because the load is now being resisted by inner structural member 632 and outer structural member 634 rather than by annular shear hub 650. One of the advantages for exhaust system isolator 630 is that when this gap is closed, there is no direct tension or compression of annular shear hub 650.

Inner structural member 632 is a metal or plastic component which comprises a generally cylindrical center portion 652 and an annular flange portion 654 attached to one end of generally cylindrical center portion 652. Generally cylindrical center portion 652 extends over or surrounds second mounting bore 642 to provide support for holding hanger pin 60 and annular flange portion 654 extends radially outward from the one end of generally cylindrical center portion 652. Annular flange portion 654 is an annular shaped component which provides a base for one end of annular shear hub 650. Elastomeric body 636 fully encapsulates inner structural member 632 and is bonded to inner structural member 632 including annular shear hub 650 being bonded to annular flange portion 654.

Outer structural member 634 is a metal or plastic component which comprises a main portion 660 having a generally planar wall which defines a first aperture 662, an axially extending cylindrical section 664, a second aperture 666 and an axially extending cylindrical section 668. Main portion 660 provides a base for the other end of annular shear hub 650. First mounting bore 640 extends through first aperture 662 and axially extending cylindrical section 664 surrounds first mounting bore 640 to provide support for holding hanger pin 60. Inner structural member 632 extends through second aperture 666 and axially extending cylindrical section 668 surrounds inner structural member 632 to act as a stop for exhaust system isolator 630. Elastomeric body 636 encapsulates outer structural member 634 including annular shear hub 650 being bonded to outer structural member 634.

Annular shear hub 650 is arranged in an axial direction of exhaust system isolator 630 such that any radial loading from the application causes shear stress in annular shear hub 650. In addition, annular shear hub 650 is not disposed between portions of inner structural member 632 and outer structural member 634 which will contact each other during peak loading. Thus, during peak loadings, annular shear hub 650 is not compressed between inner structural member 632 and outer structural member 634.

As illustrated in FIGS. 17-19, an optional annular elastomeric heat shield 672 forms an outer circumferential void 674 disposed around annular shear hub 650. Elastomeric heat shield 672 is integral with elastomeric body 636. Elastomeric heat shield provides protection against external sources of heat for annular shear hub 650.

Elastomeric body 636 defines a first chamfer 690 located at one end of second mounting bore 642 and a second chamfer 692 located at the opposite end of second mounting bore 642. First chamfer 690 interfaces with an enlarged head on hanger pin 60. Second chamfer 692 is larger than first chamfer 690 and it allows for the conical rotation or deflection of inner structural member 632 with respect to hanger pin 60 and outer structural member 634. In the preferred embodiment, the larger diameter of second chamfer 692 is approximately one and one-half times the diameter of second mounting bore 642 and second chamfer 692 has an overall length of approximately twenty millimeters. Second chamfer 692 allows for the conical movement or rotation of inner structural member 632 with respect to hanger pin 60. The allowance of this conical motion significantly improves the durability of the component by reducing the cantilever beam stress at the bottom portion of circumferential void 646.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An isolator comprising:
a single piece elastomeric body defining a heat shield;
an outer structural member attached to said elastomeric body;
an inner structural member attached to said elastomeric body;
a shear hub extending between said outer structural member and said inner structural member;
a mounting bore defined by a portion of said elastomeric body, said inner structural member surrounding said portion of said elastomeric body and said mounting bore; wherein
said heat shield surrounds said shear hub; and
an open gap is disposed directly between said shear hub and said heat shield.

2. The isolator according to claim 1, further comprising a first chamfer defined at a first end of said first mounting bore.

3. The isolator according to claim 2, further comprising a second chamfer defined at a second end of said first mounting bore.

4. The isolator according to claim 3, wherein said first chamfer extends into said mounting bore from said first end farther than said second chamfer extends into said mounting bore from said second end.

5. The isolator according to claim 1, wherein said open gap is a circumferential void disposed directly between said shear hub and said heat shield.

6. The isolator according to claim 1, wherein:
said mounting bore extends entirely through said elastomeric body in an axial direction;
said shear hub extends between said outer structural member and said inner structural member is said axial direction; and
said heat shield extends from said outer structural member in said axial direction.

7. The isolator according to claim 6, wherein said open gap is a circumferential void disposed directly between said shear hub and said heat shield.

8. The isolator according to claim 1, wherein a surface of said heat shield form an outermost circumferential surface of said elastomeric body.

9. The isolator according to claim 1, wherein the outer structural member includes a cylindrical portion and an annular potion extending radially outward from said cylindrical portion, said heat shield being attached directly to said annular portion.

10. The isolator according to claim 1, wherein said heat shield is disposed radially outward from the entire elastomeric body except said heat shield.

11. An isolator comprising:
a single piece elastomeric body defining a heat shield;
an outer structural member attached to said elastomeric body;
an inner structural member attached to said elastomeric body;
a shear hub extending between said outer structural member and said inner structural member;
a mounting bore defined by a portion of said elastomeric body, said inner structural member surrounding said portion of said elastomeric body and said mounting bore; wherein
said heat shield surrounds said shear hub; and
a first circumferential void is disposed directly between said shear hub and a portion of said elastomeric body defining said mounting bore and a second circumferential void is disposed directly between said shear hub said heat shield.

12. The isolator according to claim 11, wherein a surface of said heat shield form an outermost circumferential surface of said elastomeric body.

13. The isolator according to claim 11, wherein the outer structural member includes a cylindrical portion and an annular portion extending radially outward from said cylindrical portion, said hear shield being attached directly to said annular portion.

14. The isolator according to claim 11, wherein said heat shield is disposed radially outward from the entire elastomeric body except said heat shield.

15. An isolator comprising:
a single piece elastomeric body defining a heat shield;
an outer structural member attached to said elastomeric body;
an inner structural member attached to said elastomeric body;
a shear hub extending between said outer structural member and said inner structural member;
a mounting bore defined by a portion of said elastomeric body, said inner structural member surrounding said portion of said elastomeric body and said mounting bore;
a first chamfer defined at a first end of said mounting bore; and
a second chamfer defined at a second end of said mounting bore; wherein
said heat shield surrounds said shear hub.

16. The isolator according to claim 15, wherein said first chamfer extends into said mounting bore from said first end farther than said second chamfer extends into said mounting bore from said second end.

17. The isolator according to claim 15, wherein a surface of said heat shield form an outermost circumferential surface of said elastomeric body.

18. The isolator according to claim 15, wherein the outer structural member includes a cylindrical portion and an annular portion extending radially outward from said cylindrical portion, said heat shield being attached directly to said annular portion.

19. The isolator according to claim 15, wherein said heat shield is disposed radially outward from the entire elastomeric body except said heat shield.

* * * * *

UNITED STATES PATENT AND TRADEMARK OFFICE
CERTIFICATE OF CORRECTION

PATENT NO. : 8,646,761 B2  Page 1 of 1
APPLICATION NO. : 13/682799
DATED : February 11, 2014
INVENTOR(S) : Troy P. Rodecker It is certified that error appears in the above-identified patent and that said Letters Patent is hereby corrected as shown below:

In the Claims

Col. 17, Claim 2, line 36, after "said", delete "first";
Col. 17, Claim 3, line 38, after "said", delete "first";
Col. 17, Claim 9, line 63, delete "potion" and insert --portion--;
Col. 18, Claim 11, line 20, after "hub", insert --and--;
Col. 18, Claim 13, line 28, delete "hear" and insert --heat--.

Signed and Sealed this
Third Day of June, 2014

Michelle K. Lee
*Deputy Director of the United States Patent and Trademark Office*